United States Patent
Haller

(10) Patent No.: US 7,356,571 B2
(45) Date of Patent: Apr. 8, 2008

(54) SYSTEM, METHOD AND PROCESSOR READABLE MEDIUM FOR DOWNLOADING INFORMATION WITHIN A PREDETERMINED PERIOD OF TIME TO A DEVICE IN A NETWORK RESPONSIVE TO PRICE SELECTION

(75) Inventor: Amit Haller, Belmont, CA (US)

(73) Assignee: IXI Mobile (R&D), Ltd. (IL)

( * ) Notice: Subject to any disclaimer, the term of this patent is extended or adjusted under 35 U.S.C. 154(b) by 67 days.

(21) Appl. No.: 10/266,007

(22) Filed: Oct. 7, 2002

(65) Prior Publication Data

US 2004/0068570 A1    Apr. 8, 2004

(51) Int. Cl.
G06F 15/16 (2006.01)
(52) U.S. Cl. .................. 709/217; 709/203; 705/20; 705/50
(58) Field of Classification Search ............... 709/227, 709/231, 218, 219, 203, 217; 370/252; 455/419, 455/406; 725/87; 705/20, 50
See application file for complete search history.

(56) References Cited

U.S. PATENT DOCUMENTS

| | | | |
|---|---|---|---|
| 5,442,680 A | 8/1995 | Schellinger et al. | |
| 5,457,737 A | 10/1995 | Wen | |
| 5,572,528 A | 11/1996 | Shuen | |
| 5,742,237 A | 4/1998 | Bledsoe | |
| 5,771,438 A | 6/1998 | Palermo et al. | |
| 5,774,791 A | 6/1998 | Strohallen et al. | |
| 5,793,763 A | 8/1998 | Mayes et al. | |
| 5,805,166 A | 9/1998 | Hall et al. | |

(Continued)

FOREIGN PATENT DOCUMENTS

JP     315213     4/2001

(Continued)

OTHER PUBLICATIONS

White Paper, Handheld Devices: Comparing the Major Platforms, www.dell.com/r&d, Dec. 2000.

(Continued)

*Primary Examiner*—William Vaughn
*Assistant Examiner*—Djenane Bayard
(74) *Attorney, Agent, or Firm*—Century IP Group, Inc.; F. Jason Far-hadian, Esq.

(57) ABSTRACT

A method, system, and processor readable medium allows a user to download information to a device within a predetermined period of time at a predetermined price. In an embodiment of the present invention, a processing device is coupled to a wide area network, including a cellular network, and transfers information to the device. A user selects a representation of the information to be downloaded. A user also selects a displayed associated predetermined price, in a plurality of prices, and respective predetermined download periods of time. A processing device transfers the information to the device within the selected predetermined period of time. The respective download periods of time are determined in response to a measured download rate and size of the information. In embodiments of the present invention, the information includes processor executable software such as a ring tone or a software game. In an embodiment of the present invention, the device is a cellular device, having a WAP browser, in a short-range radio network.

14 Claims, 11 Drawing Sheets

U.S. PATENT DOCUMENTS

| | | | |
|---|---|---|---|
| 5,838,252 A | 11/1998 | Kikinis | |
| 5,896,369 A | 4/1999 | Warsta et al. | |
| 5,929,848 A | 7/1999 | Albukerk et al. | |
| 5,978,386 A | 11/1999 | Hamalainen et al. | |
| 5,987,011 A | 11/1999 | Toh | |
| 5,987,033 A | 11/1999 | Boer et al. | |
| 6,064,734 A | 5/2000 | Hasegawa et al. | |
| 6,067,291 A | 5/2000 | Kamerman et al. | |
| 6,069,896 A | 5/2000 | Borgstahl et al. | |
| 6,078,789 A | 6/2000 | Bodenmann et al. | |
| 6,085,098 A | 7/2000 | Moon et al. | |
| 6,130,602 A | 10/2000 | O'Toole | |
| 6,151,628 A | 11/2000 | Xu et al. | |
| 6,192,257 B1 | 2/2001 | Ray | |
| 6,198,948 B1 | 3/2001 | Sudo et al. | |
| 6,218,958 B1 | 4/2001 | Eichstaedt et al. | |
| 6,223,029 B1 | 4/2001 | Stenman et al. | |
| 6,243,581 B1 | 6/2001 | Jawanda | |
| 6,265,788 B1 | 7/2001 | Davidson et al. | |
| 6,282,183 B1 | 8/2001 | Harris et al. | |
| 6,298,443 B1 * | 10/2001 | Colligan et al. | 713/200 |
| 6,326,926 B1 | 12/2001 | Shoobridge et al. | |
| 6,333,973 B1 | 12/2001 | Smith et al. | |
| 6,343,276 B1 | 1/2002 | Barnett | |
| 6,405,027 B1 | 6/2002 | Bell | |
| 6,430,408 B1 * | 8/2002 | Dorenbosch | 455/414.1 |
| 6,434,537 B1 * | 8/2002 | Grimes | 705/40 |
| 6,446,127 B1 | 9/2002 | Schuster et al. | |
| 6,452,910 B1 | 9/2002 | Vij et al. | |
| 6,459,882 B1 | 10/2002 | Palermo et al. | |
| 6,463,078 B1 | 10/2002 | Engstrom et al. | |
| 6,487,180 B1 | 11/2002 | Borgstahl et al. | |
| 6,519,460 B1 | 2/2003 | Haartsen | |
| 6,532,366 B1 | 3/2003 | Chung et al. | |
| 6,600,428 B1 | 7/2003 | O'Toole et al. | |
| 6,600,734 B1 | 7/2003 | Gernert et al. | |
| 6,630,925 B1 | 10/2003 | Ostergaard et al. | |
| 6,633,759 B1 | 10/2003 | Kobayashi | |
| 6,636,489 B1 | 10/2003 | Fingerhut | |
| 6,654,616 B1 | 11/2003 | Pope et al. | |
| 6,665,549 B1 | 12/2003 | Reed | |
| 6,690,929 B1 * | 2/2004 | Yeh | 455/406 |
| 6,763,012 B1 | 7/2004 | Lord et al. | |
| 6,763,247 B1 | 7/2004 | Hollstrom et al. | |
| 6,871,063 B1 | 3/2005 | Schiffer | |
| 2001/0047424 A1 | 11/2001 | Alastalo et al. | |
| 2002/0010008 A1 | 1/2002 | Bork et al. | |
| 2002/0010683 A1 | 1/2002 | Aune | |
| 2002/0037700 A1 | 3/2002 | Dooley et al. | |
| 2002/0055333 A1 | 5/2002 | Davies et al. | |
| 2002/0058502 A1 | 5/2002 | Stanforth | |
| 2002/0063472 A1 | 5/2002 | Irvin | |
| 2002/0065099 A1 | 5/2002 | Bjorndahl | |
| 2002/0065817 A1 * | 5/2002 | Ito et al. | 707/5 |
| 2002/0068559 A1 | 6/2002 | Sharma et al. | |
| 2002/0068600 A1 | 6/2002 | Chihara et al. | |
| 2002/0069037 A1 | 6/2002 | Hendrickson et al. | |
| 2002/0082054 A1 | 6/2002 | Keinonen et al. | |
| 2002/0086718 A1 | 7/2002 | Bigwood et al. | |
| 2002/0091633 A1 * | 7/2002 | Proctor | 705/39 |
| 2002/0102974 A1 | 8/2002 | Raith | |
| 2002/0118663 A1 | 8/2002 | Dorenborsch et al. | |
| 2002/0128051 A1 | 9/2002 | Liebenow | |
| 2002/0132610 A1 | 9/2002 | Chaplin et al. | |
| 2002/0142762 A1 | 10/2002 | Chmaytelli et al. | |
| 2002/0143952 A1 * | 10/2002 | Sugiarto et al. | 709/227 |
| 2002/0155830 A1 | 10/2002 | Iyer | |
| 2002/0160764 A1 | 10/2002 | Gorsuch | |
| 2003/0005453 A1 * | 1/2003 | Rodriguez et al. | 725/87 |
| 2003/0013438 A1 | 1/2003 | Darby | |
| 2003/0017810 A1 | 1/2003 | Janninck et al. | |
| 2003/0022699 A1 | 1/2003 | Lin | |
| 2003/0027563 A1 | 2/2003 | Herle et al. | |
| 2003/0032417 A1 | 2/2003 | Minear et al. | |
| 2003/0050058 A1 | 3/2003 | Walsh et al. | |
| 2003/0054765 A1 | 3/2003 | Botteck | |
| 2003/0060188 A1 | 3/2003 | Gidron | |
| 2003/0060189 A1 | 3/2003 | Minear et al. | |
| 2003/0078036 A1 | 4/2003 | Chang et al. | |
| 2003/0091917 A1 | 5/2003 | Davenport et al. | |
| 2003/0114105 A1 | 6/2003 | Haller et al. | |
| 2003/0115351 A1 * | 6/2003 | Giobbi | 709/231 |
| 2003/0122856 A1 * | 7/2003 | Hubbard | 345/700 |
| 2003/0143992 A1 | 7/2003 | Humphrey et al. | |
| 2003/0153280 A1 * | 8/2003 | Kopp et al. | 455/90 |
| 2003/0187807 A1 * | 10/2003 | Matsubara et al. | 705/400 |
| 2003/0194090 A1 | 10/2003 | Tachikawa | |
| 2003/0214940 A1 * | 11/2003 | Takken | 370/352 |
| 2003/0224773 A1 * | 12/2003 | Deeds | 455/419 |
| 2003/0232616 A1 * | 12/2003 | Gidron et al. | 455/406 |
| 2004/0001467 A1 | 1/2004 | Cromer et al. | |
| 2004/0048671 A1 * | 3/2004 | Rowe | 463/42 |
| 2004/0066769 A1 | 4/2004 | Ahmavaara et al. | |
| 2004/0192384 A1 | 9/2004 | Anastasakos et al. | |
| 2004/0196812 A1 | 10/2004 | Barber | |
| 2006/0046664 A1 | 3/2006 | Paradiso et al. | |

FOREIGN PATENT DOCUMENTS

| | | |
|---|---|---|
| JP | 3153213 | 4/2001 |
| WO | WO/99/48315 | 9/1999 |
| WO | WO 99/48315 | 9/1999 |
| WO | WO 00/39967 | 7/2000 |
| WO | WO 01/048977 | 7/2001 |

OTHER PUBLICATIONS

Miyatsu, Bluetooth Design Background and Its Technological Features, IEICE Trans, Fundamentals, vol. E83-A, No. 11, Nov. 2000.

Parekh, Operating Systems on Wireless Handheld Devices, A Strategic Market Analysis, Massachusettes Institute of Technology, Sep. 28, 2000.

Johansson, et al., Short Range Radio Based Ad-hoc Netowrking: Performance and Properties, IEEE, 1999.

Guthery et al., "The WebSIM—Clever Smartcards Listen to Port 80", version 15.12.99.

Project P946-GI, Smart Devices "When Things Start to Think", Jan. 2000, 2000 EURESCOM Participants in Project P946-GI.

Yee et al., "Integrating Bluetooth With Wireless And Ricocheting", pp. 1310-1314, 2000 IEEE.

Haartsen, "BLUETOOTH—The universal radio interface for ad hoc wireless connectivity", pp. 110-117, Ericsson Review No. 3, 1998.

Karagiannis, "Mobility support for ubiquitous Internet access", ERICSSON Open Report, pp. 1-70, Dec. 21, 2000.

Frodigh et al., "Wireless ad hoc networking—The art of networking without a network", Ericsson Review No. 4, 2000, pp. 248-263.

Faruque et al, "Design and Analysis of Ad Hoc Wireless Networks for Battlefield Applications", Part of the SPIE Conference on Digitization of the Battlespace IV, Orlando, Florida, Apr. 1999, pp. 118-122.

Garcia-Luna-Aceves et al., "Wireless Internet Gateways (WINGS)", 1997 IEEE, pp. 1271-1276.

* cited by examiner

SYSTEM, METHOD AND PROCESSOR READABLE MEDIUM FOR DOWNLOADING INFORMATION WITHIN A PREDETERMINED PERIOD OF TIME TO A DEVICE IN A NETWORK RESPONSIVE TO PRICE SELECTION

FIELD OF THE INVENTION

This invention relates generally to a network, and in particular, for providing information to a device in a network.

BACKGROUND OF THE INVENTION

A user of a network often downloads or transfers information, such as files or software, between various devices. Transferring information over a network enables a user to easily and conveniently enhance functionality of a device on a network with minimum user intervention. A user of a wireless device is also interested in downloading information from a wireless network. A user of a wireless device may be traveling and does not have ready access to a disk drive, or other accessory, for downloading information.

A user may be interested in downloading a wide variety of content or information. A user may be interested in downloading a relatively small sized ring tone to a relatively large sized 1 megabyte software game.

However, a user of a wireless device may be reluctant to download information because of the nature of cellular networks. A user does not know how quickly the information will be downloaded at a particular time and location in the cellular network. A cellular network has limited coverage and bandwidth. A file may take anywhere from a few minutes to a couple of days to download to a device in a cellular network. A user may attempt to download during a peak time in the cellular network that could result in a lengthy download time compared to downloading during an off-peak time. Packets used to transfer the information may be dropped more often at certain areas of the cellular network and/or at a particular time in the day. Download information may be further delayed when a user travels through non-coverage areas.

Telecommunication operators would also like to increase usage of their cellular networks and customer satisfaction. Telecommunication operators are interested in maximizing revenue, while enhancing user satisfaction and expectations. A telecommunication operator is interested in providing functionality that is desired by users. There may be certain instances when a user desires to download very quickly, where in other circumstances a user is not interested in a relatively quick download.

Therefore, it is desirable to provide a method, a system, and a processor readable medium that allows a user to select how quickly information will be downloaded to a device in a wireless network. It is further desirable to increase telecommunication operator revenue, while increasing wireless device functionality and user satisfaction.

SUMMARY OF THE INVENTION

A method, system, and processor readable medium allows a user to download information to a device within a predetermined period of time at a predetermined price. In an embodiment of the present invention, a processing device is coupled to a wide area network, including a cellular network, and transfers information to the device. A user selects a representation of the information and a displayed first price, in a plurality of prices, and respective predetermined download periods of time. A processing device transfers information to the device within the selected predetermined period of time. The respective download periods of time are determined in response to a measured date rate and the size of the information. In embodiments of the present invention, the information includes processor executable software such as a ring tone or a software game. In an embodiment of the present invention, the device is a cellular device, having a WAP browser, in a short distance radio network.

According to an embodiment of the present invention, the short distance wireless network is a Bluetooth™ network.

According to an embodiment of the present invention, the first processing device stores a rate schedule having a first price and a first period of time and a second price and a second period of time. The first price is greater than the second price and the first period of time is less than the second period of time.

According to an embodiment of the present invention, a user is not charged if the file is not transferred within the period of time.

According to an embodiment of the present invention, the second price is free and the second period of time is approximately 24 hours.

According to an embodiment of the present invention, the device includes a short-range radio processor and a 2.4 or 5.7 GHZ transceiver.

According to an embodiment of the present invention, the device is a cellular telephone or a cellular modem.

According to still a further embodiment of the present invention, the cellular device uses a protocol selected from the group consisting of a Global System for Mobile Communications ("GSM"), a Code Division Multiple Access ("CDMA"), a CDMA 2000 protocol, a Time Division Multiple Access ("TDMA"), General Packet Radio Services ("GPRS") and an equivalent thereof.

According to an embodiment of the present invention, the device is selected from a group consisting of a desktop computer, a laptop computer, a personal digital assistant, a headset, a messaging terminal, a pager, a printer, a thin terminal, a watch, a digital camera or an equivalent.

According to an embodiment of the present invention, a method comprises the steps of selecting a representation of the information to be downloaded to a device. A price and download period of time is selected. The information is then downloaded to the device within the download period of time.

According to an embodiment of the present invention, the method further comprises the step of charging the price responsive to the downloading step.

According to an embodiment of the present invention, the method further comprises the step of crediting the price responsive to the file not being downloaded within the download period of time.

According to an embodiment of the present invention, a method comprises the steps of receiving an information selection to be downloaded to a device and receiving a price and a period of time selection. The information is downloaded to the device within a period of time indicated by the period of time selection.

According to an embodiment of the present invention, the method further comprises providing the price and period of time selection to a user of the device.

According to an embodiment of the present invention, the method further comprises providing an invoice including the price to a user of the device.

According to an embodiment of the present invention, the method further comprises crediting a user the price if the file was not downloaded within the period of time.

According to an embodiment of the present invention, the method further comprises obtaining the download period of time for information having a particular size and transferred at a predetermined time on a predetermined network.

According to an embodiment of the present invention, an article of manufacture, including a processor readable medium, is provided. The article comprises a display software component to provide a price and a respective period of time selection. A download agent software component transfers the price and period of time selection and receives information responsive to the selection.

According to an embodiment of the present invention, an article of manufacture, including a processor readable medium, comprises a display software component to provide a price and a respective period of time selection. A cellular software component receives a cellular signal, containing information during a period of time indicated by the period of time selection, from a cellular network. A short-range radio software component generates a short-range radio signal in the short distance wireless network responsive to the information.

According to an embodiment of the present invention, an article of manufacture, including a processor readable medium, comprises a transfer software component to transfer information to a cellular device within a period of time responsive to a period of time selection and price selection. A database software component stores the information. A rate database software component stores a first download rate, in a plurality of download rates, associated with the first period of time selection. A billing software component generates an invoice including a first price associated with the price selection. A statistics software component obtains the plurality of download rates for predetermined times and locations.

Other aspects and advantages of the present invention can be seen upon review of the figures, the detailed description, and the claims that follow.

DETAILED DESCRIPTION

I. System Overview

The following description and claims relate to a method, a system, and a processor readable medium for downloading information to a wireless device within a period of time and price selected by a user according to embodiments of the present invention.

Figure 1:
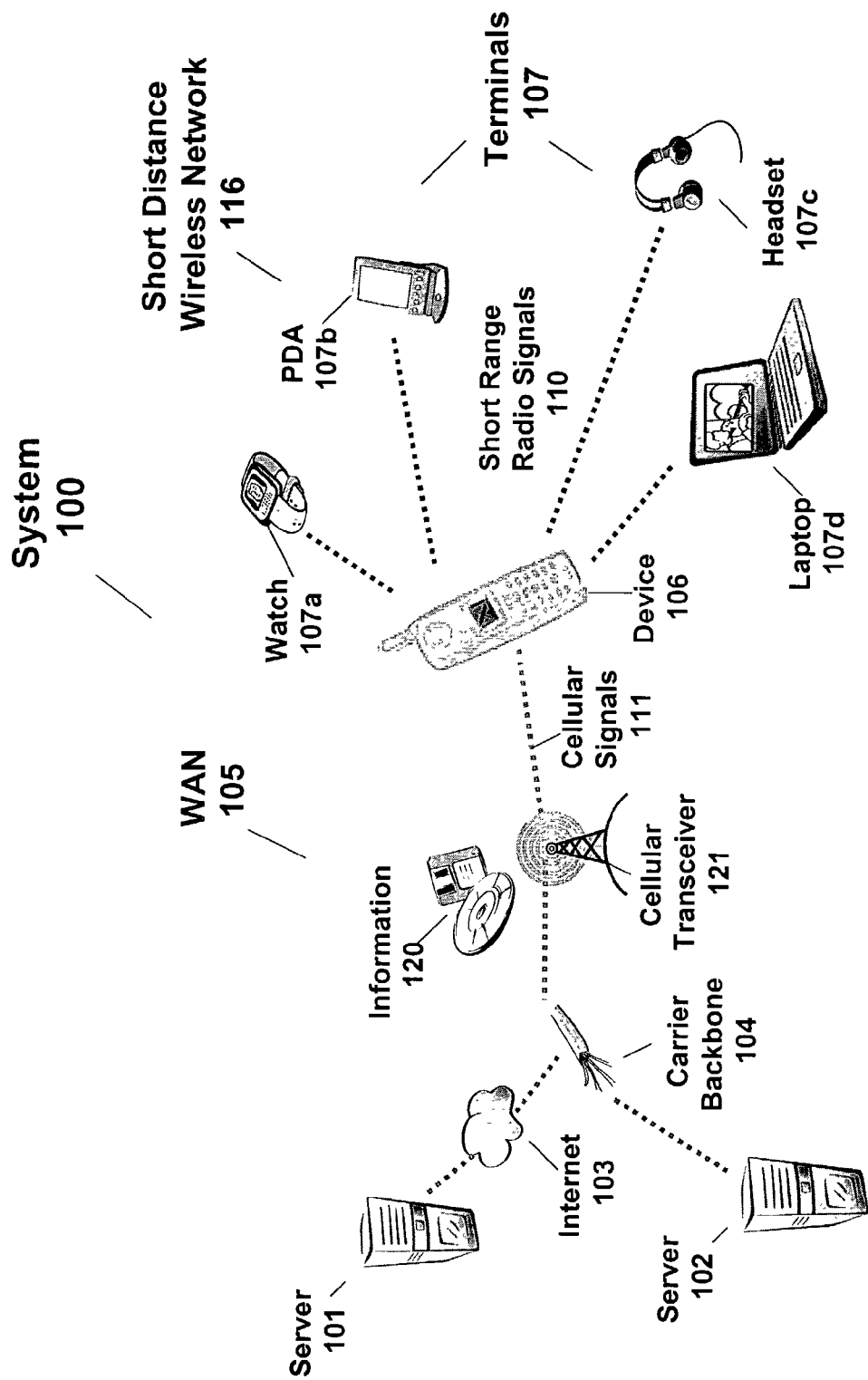
FIG. 1 illustrates a system according to an embodiment of the present invention.

In an embodiment of the present invention, information 120 is downloaded from a server 101 to a cellular device 106, coupled to a wide area network 105, as illustrated by FIG. 1. In an embodiment of the present invention, a cellular device 106 is coupled to a cellular network and a short distance wireless network 116. In an embodiment of the present invention, information 120 is transferred to terminals 107 from device 106.

In an embodiment of the present invention, a short distance wireless network 116 is a network of processing devices, such as a personal computer or headset, that span a relatively small physical area, wherein at least one device generates and receives a short-range radio signal for communicating with another device in the network. In an embodiment of the present invention, a short-range radio signal can travel between approximately 0 and approximately 1000 feet. An example of a short distance wireless network includes a network of devices formed by Bluetooth™, HomeRF, 802.11 technologies, or an equivalent, singly or in combination. In an embodiment of the present invention, each processing device in a short distance wireless network has its own processing unit that executes a software component stored on the processing device memory, but also may access data and devices on the short distance wireless network. In an embodiment of the present invention, a wire, and in particular an Ethernet, provides communication between two or more processing devices in a short distance wireless network. In an alternate embodiment, electromagnetic signals provide wireless communication between one or more processing devices in a short distance wireless network. In still another embodiment, both wires and electromagnetic signals provide communication between processing devices in a short distance wireless network.

In an embodiment of the present invention, a WAN includes multiple LANs and/or short distance wireless networks connected over a relatively large distance. Telephone lines and electromagnetic signals, singly or in combination, couple the LANs and/or short distance wireless networks in a WAN. In an embodiment of the present invention, WAN 105 includes a cellular network, and in particular cellular transceiver 121, generating and receiving cellular signals 111. In an embodiment of the present invention, a cellular network is defined as a communications system dividing a geographic region into sections, called cells. In an analog embodiment of the present invention, the purpose of this division is to make the most use out of a limited number of transmission frequencies. In an analog embodiment of the present invention, each connection, or for example conversation, requires its own dedicated frequency, and the total number of available frequencies is about 1,000. To support more than 1,000 simultaneous conversations, cellular systems allocate a set number of frequencies for each cell. Two cells can use the same frequency for different conversations so long as the cells are not adjacent to each other.

Figure 3A:
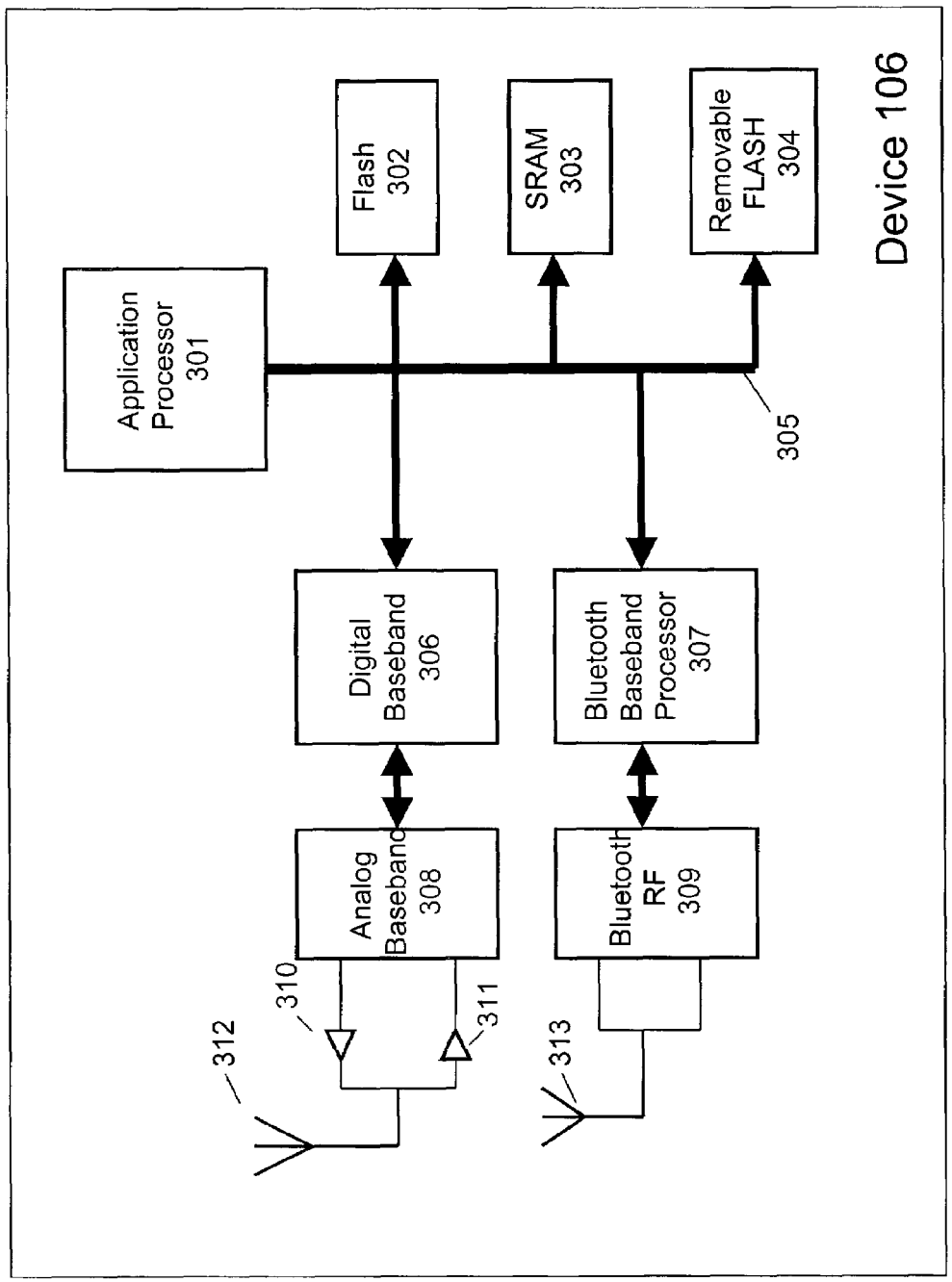
FIGS. 3*a-b* illustrate hardware architecture of devices according to an embodiment of the present invention.
Figure 3B:
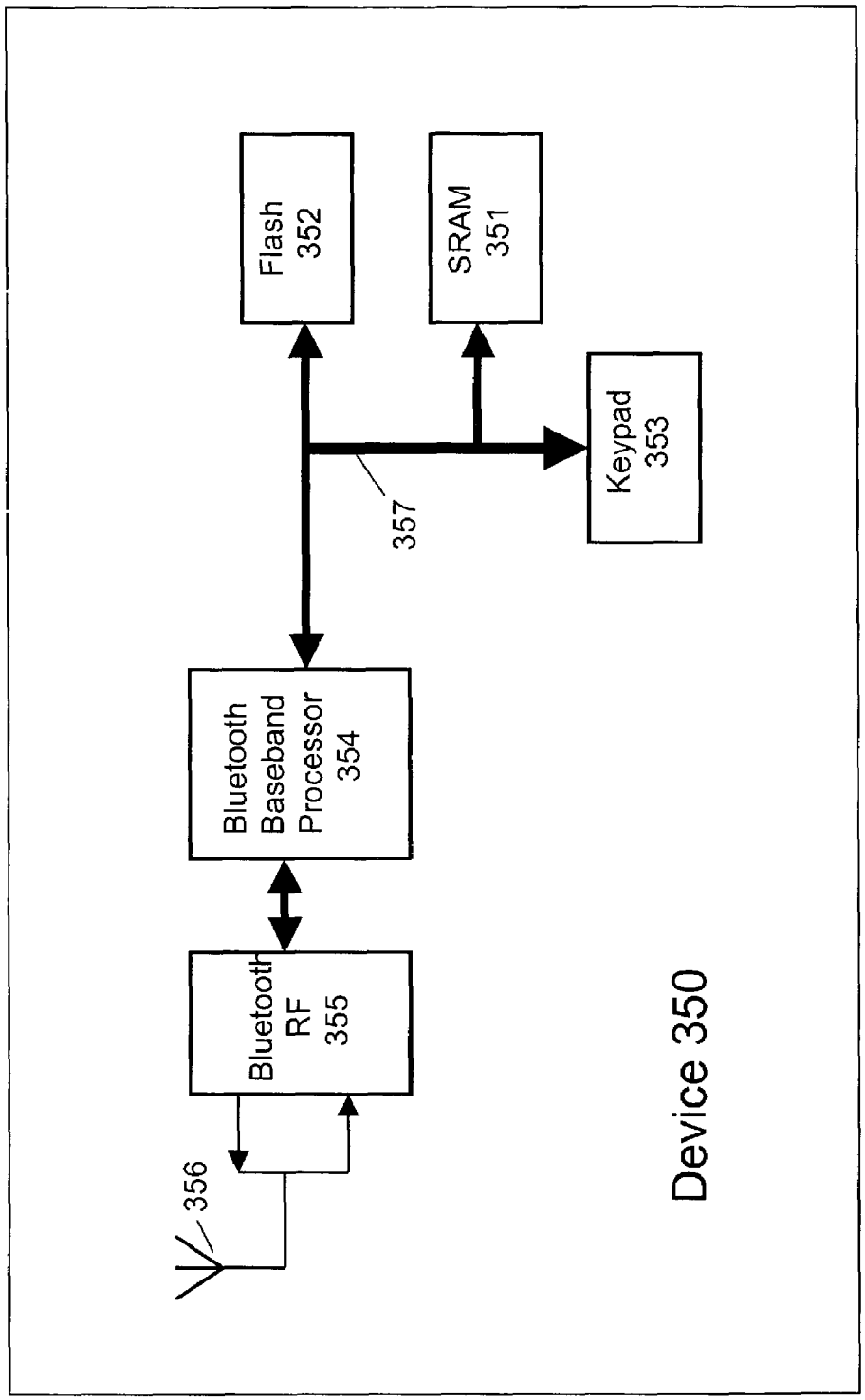

FIG. 1 illustrates system 100 according to an embodiment of the present invention. System 100 includes other devices, or terminals 107, coupled to wireless device 106. In an embodiment of the present invention, device 106 and one or more terminals 107 communicate to form a short distance wireless network 116. In an embodiment of the present invention, terminals 107 are coupled to device 106 by short-range radio signals 110 to form short distance wireless network 116. In an embodiment of the present invention, some or all of terminals 107 may have wired connections. In an embodiment of the present invention, terminals 107 include watch 107a, PDA 107b, headset 107c and laptop computer 107d that generate respective output signals. In an alternate embodiment, terminals 107 include a desktop computer, a pager, a printer, a thin terminal, a messaging terminal, a digital camera or an equivalent. In an embodiment of the present invention, terminals 107 include a Bluetooth™ 2.4 GHz transceiver. Likewise, device 106 includes a Bluetooth™ 2.4 GHZ transceiver. In an alternate embodiment of the present invention, a Bluetooth™ 5.7 GHz transceiver is used. Hardware for device 106 and terminals 107 is illustrated in FIGS. 3a-b in an embodiment of the present invention.

In alternate embodiments of the present invention, other local wireless technologies, such as 802.11 or HomeRF signals, are used to communicate between device 106 and terminals 107.

In an embodiment of the present invention, WAN 105 is coupled to device 106. In an embodiment of the present invention, WAN 105 includes a cellular network transmitting and receiving cellular signals 111. In an embodiment of the present invention, cellular signals 111 are transmitted using a protocol, such as a Global System for Mobile communications ("GSM") protocol. In alternate embodiments, a Code Division Multiple Access ("CDMA"), CDMA 2000, Universal Mobile Telecommunications System ("UMTS"), Time Division Multiple Access ("TDMA"), General Packet Radio Service ("GPRS") protocol or an equivalent is used.

In an embodiment of the present invention, WAN 105 includes carrier backbone 104, servers 101-102 and Internet 103. In an embodiment of the present invention, IP packets are transferred between the components illustrated in FIG. 1. In alternate embodiments of the present invention, other packet types are transferred between the components illustrated in FIG. 1.

In an embodiment of the present invention, a WAN 105 includes an IP public or private network, such as a corporate secured network using a Virtual Private Network ("VPN").

In an alternate embodiment of the present invention, device 106 is coupled to a WAN 105 by an Ethernet, Digital Subscriber Line ("DSL"), or cable modem connection, singly or in combination.

In an embodiment of the present invention, device 106 is a cellular handset or telephone. In an alternate embodiment of the present invention, device 106 is a cellular enabled PDA, wireless modem and/or wireless laptop computer.

In an embodiment of the present invention, WAN 105 is coupled to a wireless carrier internal network or carrier backbone 104. In an embodiment of the present invention, server 102 is coupled to carrier backbone 104. In an alternate embodiment of the present invention, carrier backbone 104 is coupled to Internet 103. Server 101 is coupled to Internet 103. In an embodiment of the present invention, servers 101 and 102 download information to device 106 and/or terminals 107 within a period of time and for a price selected by a user. In an embodiment of the present invention, information 120 is ultimately downloaded and stored in device 106. In an alternate embodiment of the present invention, information 120 is stored on respective terminals 107.

Figure 6A:
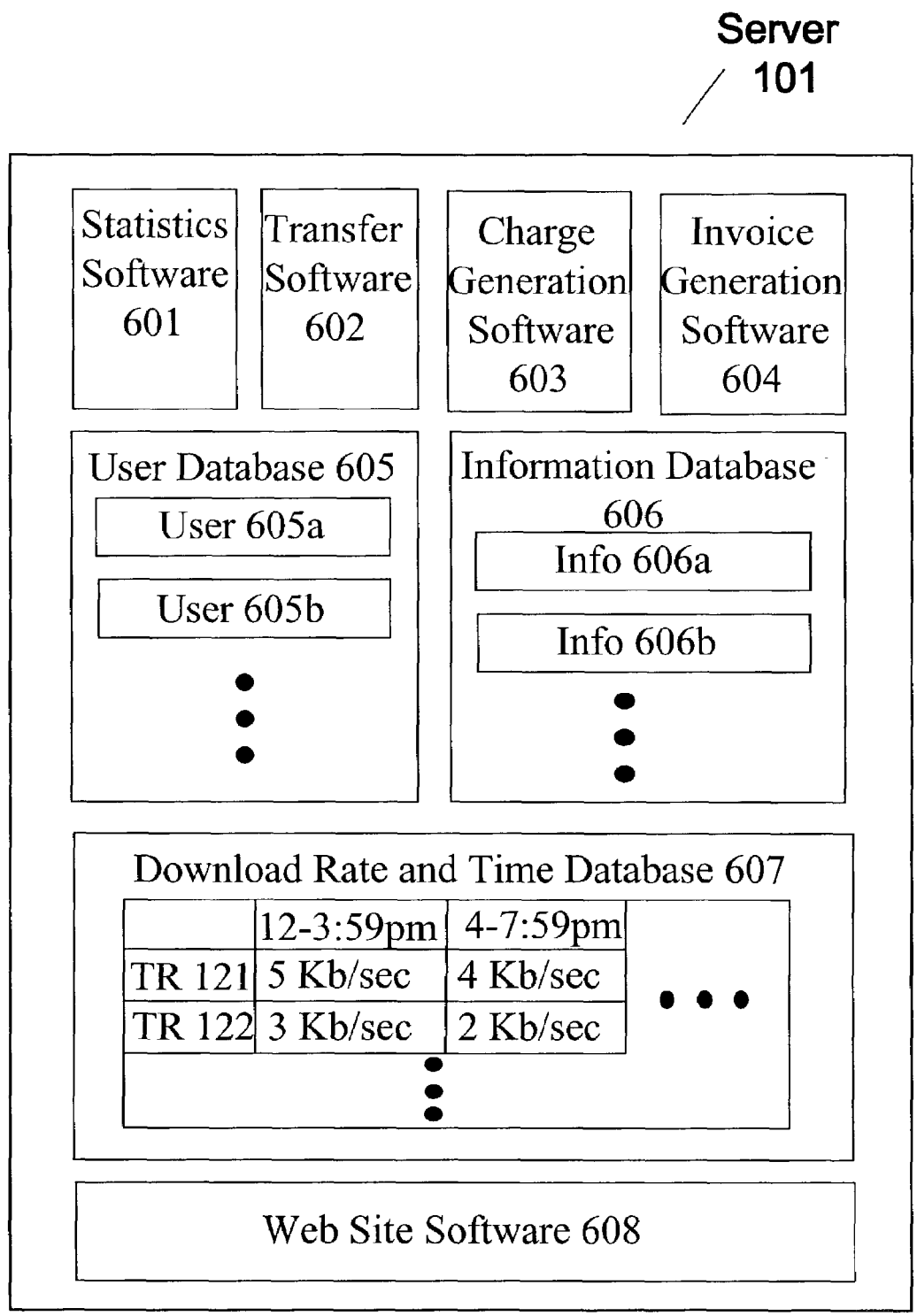
FIGS. 6*a-b-c* illustrate a software block diagram architecture of server 101 according to an embodiment of the present invention.

In an embodiment of the present invention, server 101 stores statistics software component 601, file transfer software component 602, charge generation software component 603, invoice generation software component 604, user database 605, information database 606, download rate and time database 607, and web site software component 608, singly or in combination, as illustrated in FIG. 6a. In an alternate embodiment of the present invention, software components are stored and distributed in multiple respective servers and/or processing devices. In particular, information such as a software game, is transferred from a remote server to a device. In an embodiment of the present invention, the respective software components are stored on an article of manufacture, such as a processor readable medium, singly or in combination.

Statistics software component 601 obtains and stores the respective download rates for transferring information in a WAN 105 according to an embodiment of the present invention. Statistics software component 601 obtains and stores the average download rate for download information to a particular device at a particular location in WAN 105. In an embodiment of the present invention, statistics software component 601 causes a predetermined amount of information to be transferred to a device in a predetermined location at a predetermined time in WAN 105. Statistics software component 601 causes the predetermined amount of information to be transferred periodically and stores the download rate, time of initiating transfer and destination location into download rate and time database 607a. The download rate is averaged for a particular time period and destination location over an average time period and stored in download rate and time database 607a.

In an alternate embodiment of the present invention, download rate and time database 607a is not obtained from measurements, but is calculated and stored from a theoretical cellular network model.

File transfer software component 602 transfers information 120, such as software, to devices in WAN 105. In an embodiment of the present invention, information 120 is transferred from server 101 to device 106 and then transferred by device 106 to a terminal in terminals 107. In an embodiment of the present invention, file transfer software component 602 transfers information in response to a message from statistics software component 601. In an alternate embodiment of the present invention, file transfer software component 602 transfers information from information database 606 to device 106 in response to a user selection message. In an embodiment of the present invention, a user selection message is generated by device 106, a computer coupled to Internet 103, or in response to a user making a selection by way of a telephone coupled to server 101, singly or in combination. In an embodiment of the present invention, a user telephones a telecommunication operator and verbally orders information 120 through a human or voice recognition system. A user selection message includes the selected information to be downloaded, price and download time in an embodiment of the present invention. In an embodiment of the present invention, information 120 is transferred from server 101 to device 106 using an Internet/Protocol ("IP") message. In an embodiment of the present invention, file transfer software component 602 generates a message to charge generation software component 603 indicating whether information was transferred to a device in WAN 105 within the period of time selected by a user.

Charge generation software component 603 generates a charge associated with transferring information 120 to a device 106 in WAN 105 in an embodiment of the present invention. A charge message is sent from charge generation software component 603 to invoice software component 604 in response to a transfer message from file transfer software component 602. If information is transferred to device 106 within the period of time selected by a user, the respective charge message indicating the price of the transfer is generated to invoice software component 604. If information 120 was not transferred within the period of time selected by a user, a respective charge message indicating a free transfer is generated to invoice software component 604. In an alternate embodiment of the present invention, a charge message, including a charged price, is generated from charge generation software 603 and stored in user database 605, and in particular a user record 605*a* associated with a user downloading information 120. Invoice generation software 604 then generates an invoice to respective users based on stored charges in user database 605 in an embodiment of the present invention.

Invoice software component 604 is responsible for providing an invoice to a user in response to transferring information to device 106. An Invoice is printed out on a printer by invoice software component 604 and mailed to the user on a periodic basis in an embodiment of the present invention. In an alternate embodiment of the present invention, an invoice is e-mailed to the user. In an alternate embodiment of the present invention, an invoice is used to automatically debit a user bank account. Invoice generation software component 604 accesses user database 605 in order to obtain user information, such as a user address and charges, in generating an invoice.

User database 605 includes information on respective users of devices in WAN 105, and in particular a user of device 106, in an embodiment of the present invention. For example, user database 604 includes a record for a first user identified as user record 605*a* and a second user identified as user record 605*b*. In an embodiment of the present invention, user database 604 includes respective addresses of users and the types of devices and/or terminals in respective user's short distance wireless networks.

Information database 606 includes information, including information 120, that is transferred to device 106 from server 101 in an embodiment of the present invention. Information database 606 includes a variety of different types of information in an embodiment of the present invention.

In an embodiment of the present invention, information 120 is processor executable software, such as a new software driver for a terminal, an electronic file, a ring tone, a software game, an audio file, an image file, a video file, a vibration file, or an equivalent, singly or in combination. In particular, information 120 may include a variety of different types of files, such as: a GIF ("Graphics Interchange Format") file, a JPEG ("Joint Photographic Experts Group") file, an AVI file, a MPEG-1 ("Moving Picture Experts Group") file, a MPEG-2 file, a MPEG-3 file, a MPEG-4 file, a Video for Windows file, an Indeo file, a Quicktime file, a vibration file for generating a vibration signal, a font file such as a Windows FON file, a MP3 file, a .OUT file, a .EXE file or an equivalent, singly or in combination.

Likewise as described above, information 120 is stored in formats for a variety of different types of devices and terminals. For example, an audio file for a Sony Ericsson cellular telephone ring tone may be stored as well as an audio file for a Motorola STARTAC cellular telephone.

Figure 7:
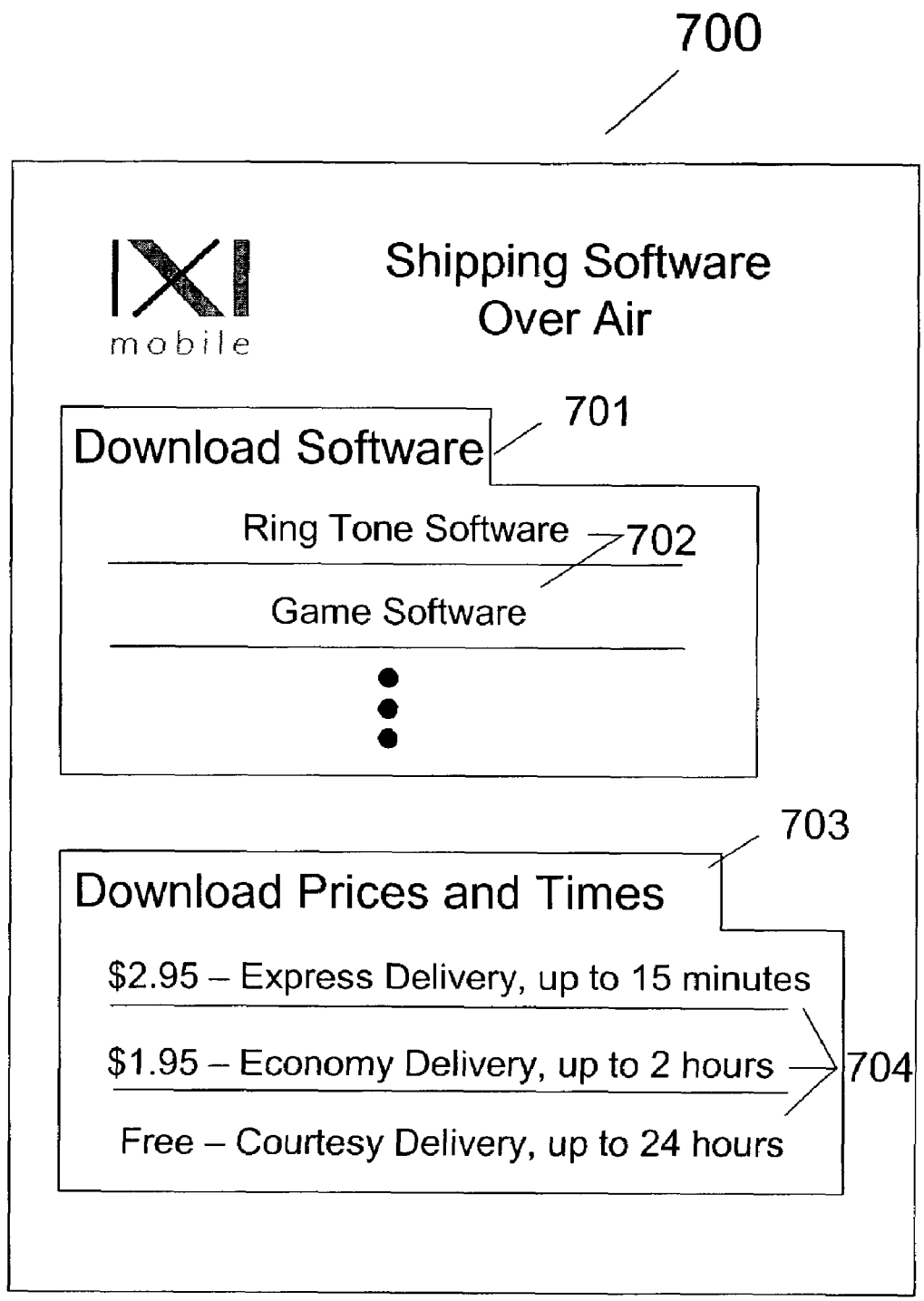
FIG. 7 illustrates a screen displaying representations of information to be downloaded within respective periods of time and prices to a device according to an embodiment of the present invention.

Web site software component 608 is stored and accessible from server 101 by device 106 in an embodiment of the present invention. In an alternate embodiment of the present invention, web site software component 608 is stored and accessible from an alternate server. In an embodiment of the present invention, web site software component 608 provides a web page or pages illustrating representations of downloadable information along with download times and prices. In an embodiment of the present invention, web site software component 608 provides a web page as illustrated by FIG. 7.

Server 102, coupled to carrier backbone 104, has similar software components described above and bypasses Internet 103 in an alternate embodiment of the present invention.

II. Hand-Held Device/Terminal Hardware

Figure 2:
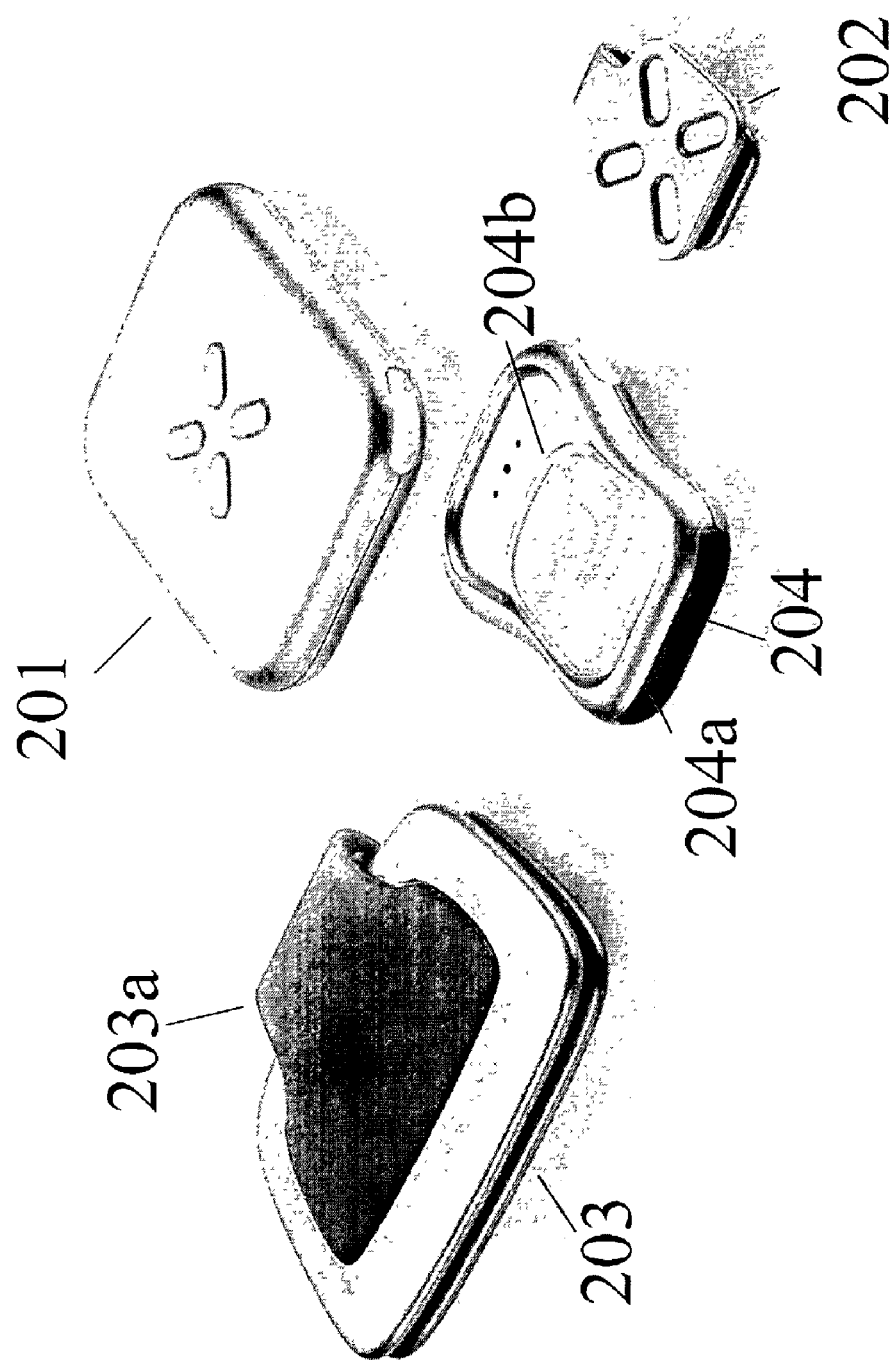
FIG. 2 illustrates thin terminals and a wireless device according to an embodiment of the present invention.

FIG. 2 illustrates embodiments of terminals 107 and device 106. In an embodiment of the present invention, there are two types of terminals: 1) smart terminals and 2) thin terminals. In an alternate embodiment of the present invention, smart terminals execute user logic and applications. Smart terminals have a relatively powerful processing unit, operating system and applications. Their main needs from a short distance wireless network 116 are access to a WAN 105 through TCP/IP and other network services such as storage and execution. For example, a laptop computer 107*d* and PDA 107*b* are smart terminals. Thin terminals have a relatively low power processing unit and operating system. They are mainly used as peripherals to an application server in a short distance wireless network 116 and their main task is user interaction, rendering output for a user and providing an application server with a user's input. For example, a watch 107*a* or messaging terminals can be thin terminals.

FIG. 2 illustrates thin terminals. Voice terminal 204 includes a display 204*b* and a retractable keypad 204*a*. Messaging Terminal 203 is illustrated in a closed position with a hinge 203*a* used to open and close terminal 203. Terminal 203 also includes a miniature QWERTY keyboard and display when opened.

In an embodiment of the present invention, device 201 is a cellular modem and includes a clip 202 for a belt.

FIG. 3*a* illustrates a hardware block diagram of device 106 in an embodiment of the present invention. Device 106 includes both internal and removable memory. In particular, device 106 includes internal FLASH (or Electrically Erasable Programmable Read-Only Memory ("EEPROM")) and Static Random Access Memory ("SRAM") 302 and 303, respectively. Removable FLASH memory 304 is also used in an embodiment of the present invention. Memories 302, 303, and 304 are coupled to bus 305. In an embodiment of the present invention, bus 305 is an address and data bus. Application processor 301 is likewise coupled to bus 305. In an embodiment of the present invention, processor 301 is a 32-bit processor.

Bluetooth™ processor 307 is also coupled to bus 305. Bluetooth™ RF circuit 309 is coupled to Bluetooth™ processor 307 and antenna 313. Processor 307, RF circuit 309 and antenna 313 transceive and receive short-range radio signals to and from terminals 107, illustrated in FIG. 1, or device 350 illustrated in FIG. 3*b*.

Cellular, such as GSM, signals are transmitted and received using digital circuit 306, analog circuit 308, transmitter 310, receiver 311 and antenna 312. Digital circuit 306 is coupled to bus 305. In alternate embodiments, device 106 includes a display, a speaker, a microphone, a keypad and a touchscreen, singly or in combination.

FIG. 3*b* illustrates device 350 that is a hand-held device in an embodiment of the present invention. Device 350, in an embodiment of the present invention, is one of the terminals 107 illustrated in FIG. 1. Similar to device 106, device 350 includes SRAM and FLASH memory 351 and 352, respectively. Memories 351 and 352 are coupled to bus 357. In an embodiment of the present invention, bus 357 is an address and data bus. Keypad 353 is also coupled to bus 357. Short-range radio signals are transmitted and received using Bluetooth™ processor 354 and Bluetooth™ RF circuit 355. Antenna 356 is coupled to Bluetooth™ RF circuit 355. In an embodiment of the present invention, antenna 356 transmits and receives short-range radio signals. In alternate embodiments, device 350 includes a display, a speaker, a microphone, a keypad and a touchscreen, singly or in combination. As one of ordinary skill in the art would appreciate, other hardware components would be provided for device 350 in alternate embodiments of the present invention. For example in an embodiment in which device 350 is a laptop computer 107d, a disk drive and other input/output components are present.

III. Software

Figure 4:
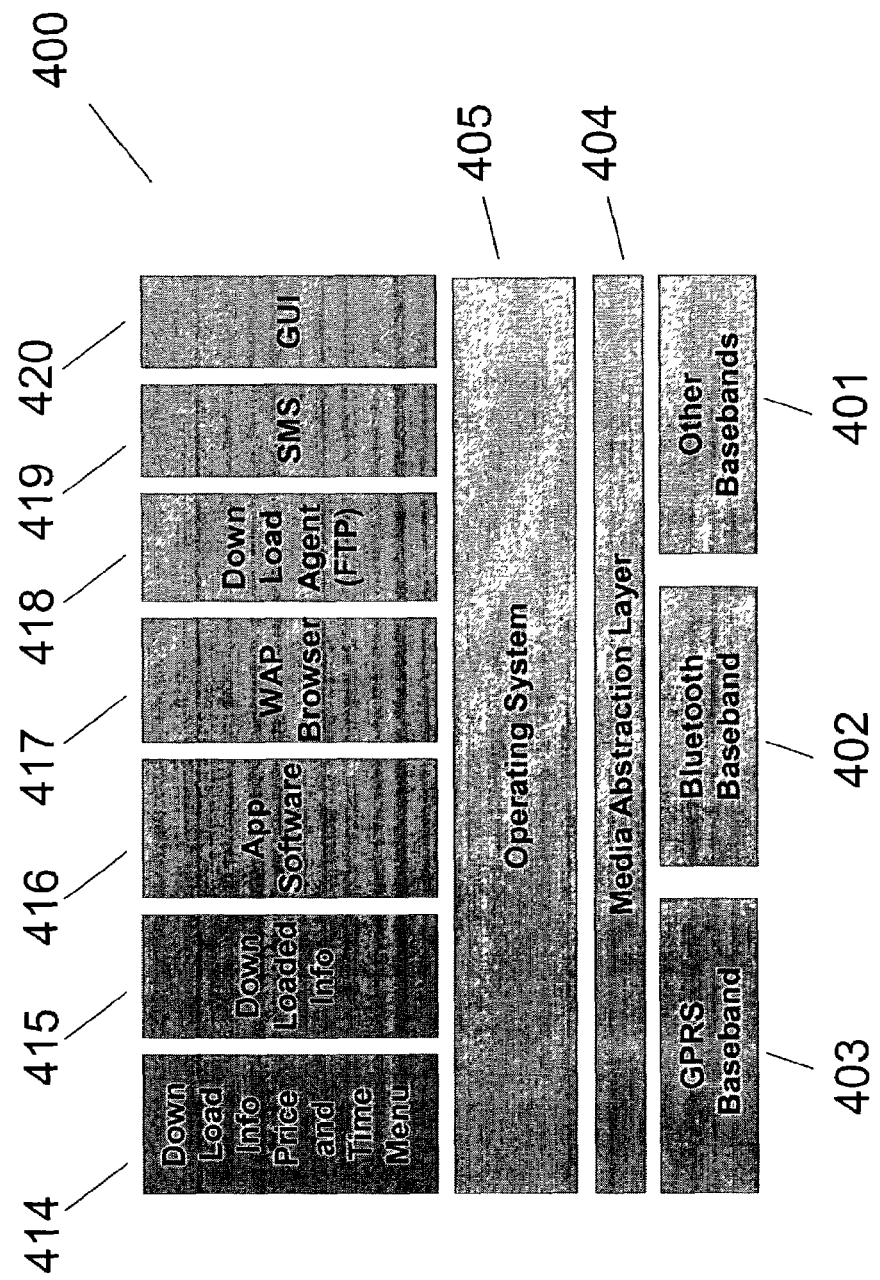
FIG. 4 is a software block diagram architecture for a device used to select information to be downloaded within a predetermined period of time and predetermined price according to an embodiment of the present invention.

FIG. 4 illustrates a software architecture 400 for device 106 illustrated in FIG. 3a according to an embodiment of the present invention. In an embodiment of the present invention, software 400 is stored in FLASH memory 302 of device 106. In an alternate embodiment of the present invention, software components 414, 415, 416, 417, 418, 419 and 420 are stored in FLASH memory 352 in a terminal of terminals 107. In an embodiment of the present invention, software components referenced herein represent a software program, a software object, a software function, a software subroutine, a software method, a software instance, and a code fragment, singly or in combination. In an alternate embodiment, functions performed by software components illustrated in FIG. 4 are carried out completely or partially by hardware.

In an embodiment of the present invention, software 400, or components of software 400, is stored in an article of manufacture, such as a processor readable medium. For example, software 400 is stored in a magnetic hard disk, an optical disk, a floppy disk, Compact Disk Read-Only Memory ("CD-ROM"), Random Access Memory ("RAM"), Read-Only Memory ("ROM"), or other readable or writeable data storage technologies, singly or in combination. In yet another embodiment, software 400, or components thereof, is downloaded from server 101 illustrated in FIG. 1.

Software 400 includes telecommunication software or physical layer protocol stacks, in particular cellular communication software 403 and short-range radio communication software 402. In an embodiment of the present invention, communication software 403 is a GPRS baseband software component used with processor 306 to transmit and receive cellular signals. In an embodiment of the present invention, communication software 402 is a Bluetooth™ baseband software component used with processor 307 to transmit and receive short-range radio signals. Other telecommunication software may be used as illustrated by other basebands 401.

In an embodiment of the present invention, operating system ("OS") 405 is used to communicate with telecommunication softwares 402 and 403. In an embodiment of the present invention, operating system 405 is a Linux operating system, EPOC operating system available from Symbian software of London, United Kingdom or a PocketPC or a Stinger operating system available from Microsoft® Corporation of Redmond, Wash. or Nucleus operating system, available from Accelerated Technology, Inc. of Mobile, Ala. Operating system 405 manages hardware and enables execution space for device software components.

Media abstraction layer 404 allows operating system 405 to communicate with basebands 403, 402 and 401, respectively. Media abstraction layer 404 and other abstraction layers translate a particular communication protocol, such as GPRS, into a standard command set used by a device and/or terminal. The purpose of an abstraction layer is to isolate the physical stacks from the rest of the device software components. This enables future usage of different physical stacks without changing any of the upper layer software and allows the device software to work with any communication protocol.

Software 400 includes download price and time menu software component 414 that provides a menu of representations of information, such as particular software, that may be downloaded along with current respective download times and prices.

FIG. 7 illustrates a display 700 showing download software menu 701 and download prices and times menu 703 that is provided by menu software component 414. In an embodiment of the present invention, download software menu 701 includes representations of information 702 that may be downloaded, such as ring tone software and/or game software. Download prices and times menu 703 includes prices and download times 704 for downloading the information represented in menu 701.

In an embodiment of the present invention, software component 414 is used to provide display 700 on cellular device 106. In an embodiment of the present invention, representations 702 are icons and may be selected by a user selecting an appropriate button on a keypad or touch screen. In an alternate embodiment of the present invention, display 700 is provided on terminals 107. In an embodiment of the present invention, software component 414 is downloaded or updated periodically to reflect current prices and download times. In an alternate embodiment of the present invention, software component 414 is downloaded upon a user request of downloading information. In an embodiment of the present invention, software component 414 is downloaded from charge generation software component 603, and in particular download price and time menu generation software component 603a, stored on server 101 as shown in FIG. 6c.

Figure 6B:
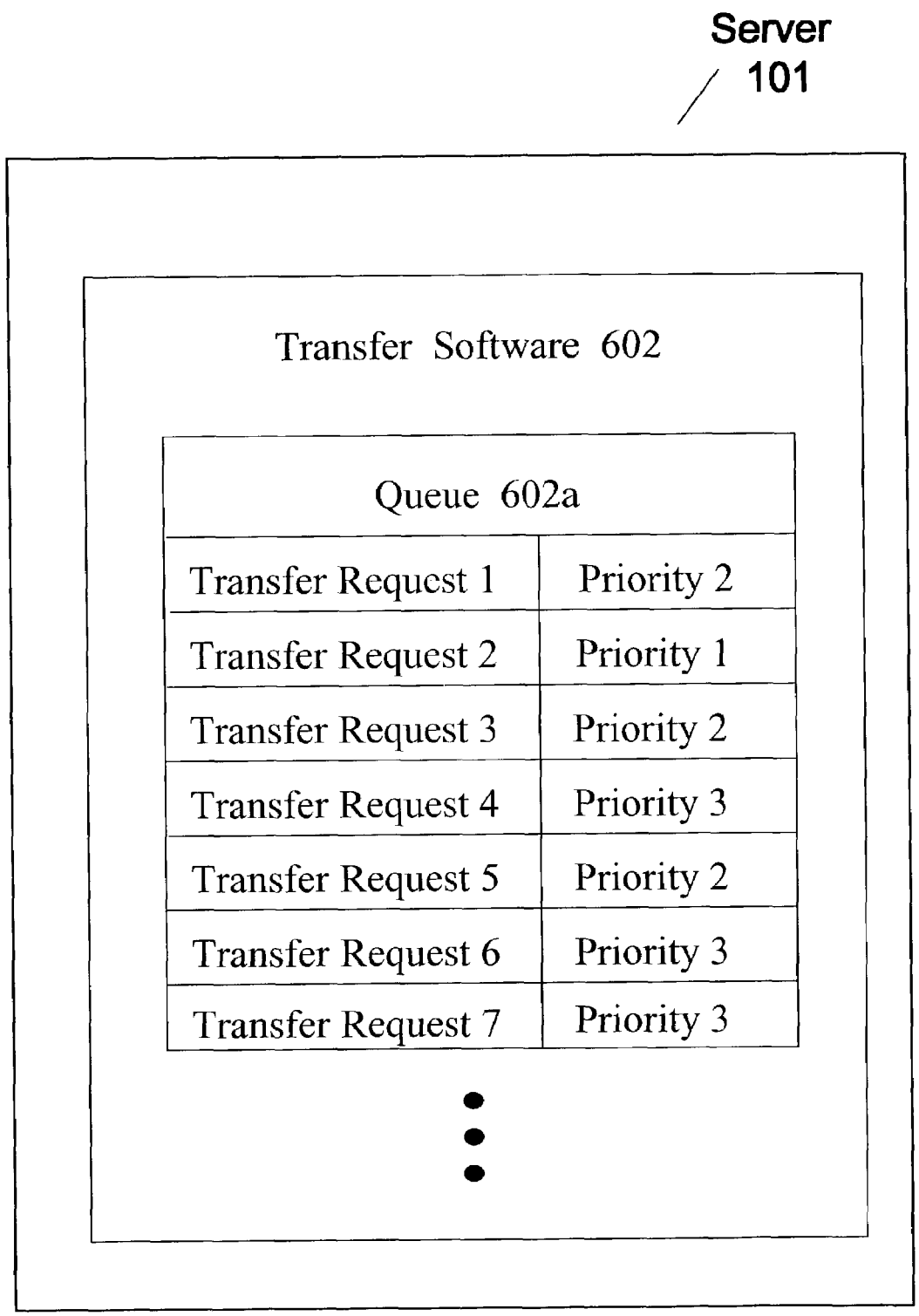
Figure 6C:
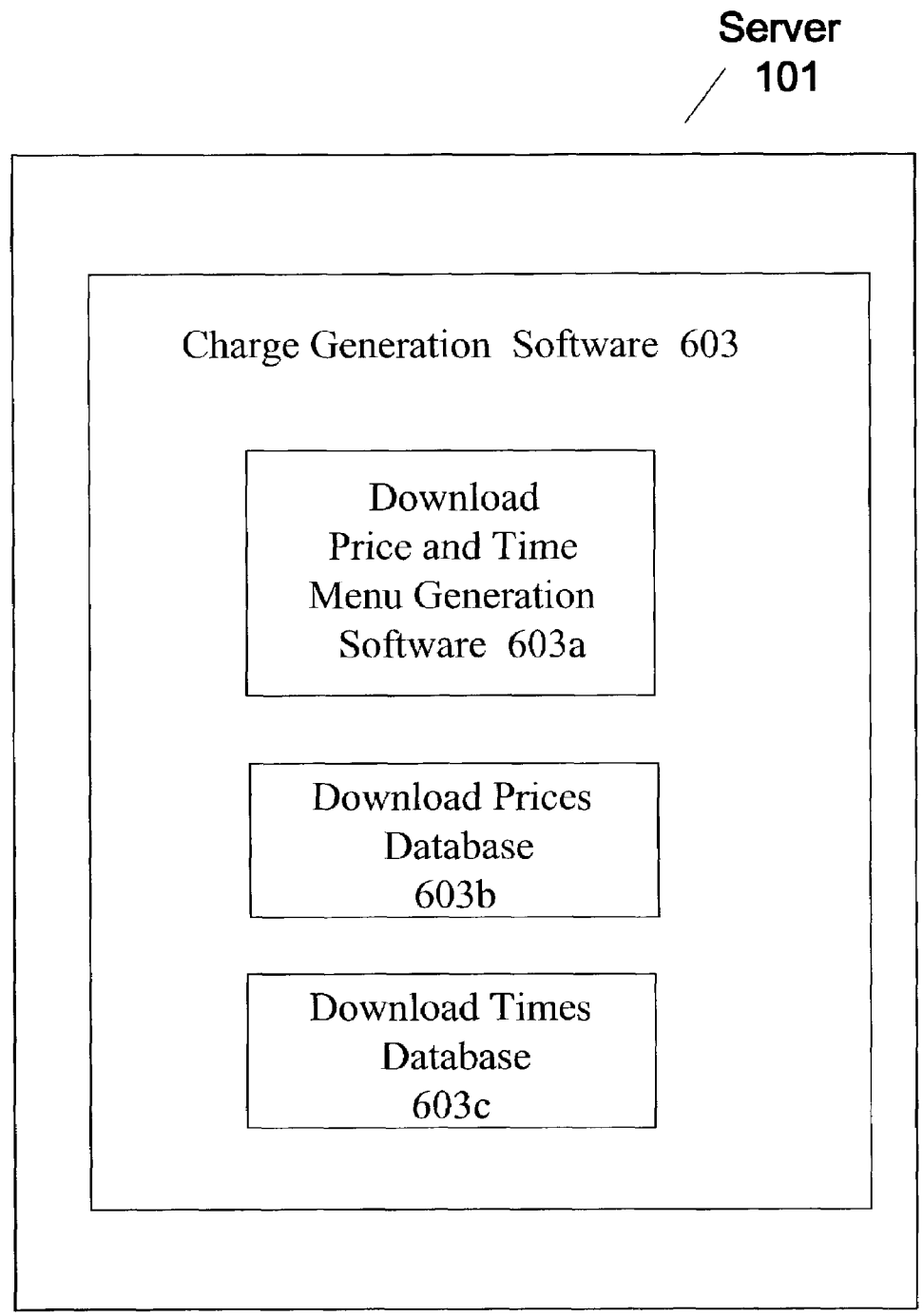

In an embodiment of the present invention, download information price and time menu 414 is generated by charge generation software 603, and in particular, download price and time menu generation software 603a shown in FIG. 6c. In an embodiment of the present invention, download price and time menu generation software 603a access download prices database 603b and download times database 603c for generating a download price and time menu. In an embodiment of the present invention, download price and time menu generation software 603a provides download prices and times for representations of information provided by web site software 608.

In an embodiment of the present invention, download prices in database 603b are set based on the content of information 120. For example, if information 120 is a newly released and highly desirable software game, a premium or higher price is set in database 603b compared to less desirable information. Alternatively, a telecommunication operator may set a very low price for promotions. In still a further embodiment of the present invention, download prices in database 603b are prices per Kbytes of information to be downloaded based on the time of day. A higher price per Kbytes of information is stored in database 603b for peak cellular network usage times; while, a lower price per Kbytes of information is stored for off-peak cellular network usage times. In still a further embodiment of the present invention, charge generation software 603 calculates a download price by multiplying a price per Kbytes in download prices database 603b by the size of the information to be downloaded without respect to the time of day.

Download times are calculated and stored in database 603c by obtaining a particular download rate associated with a particular user location and time from download rate and time database 607. The measured download rate from database 607 is then multiplied by the size of the information to be downloaded. An average download time is then obtained and may be adjusted depending upon price. For example, if a download time of 5 minutes is calculated for a particular information at a particular time and user location in WAN 105, a doubled download time of 10 minutes is stored into database 603c for providing a "Express Delivery" time in a menu; a larger margin, or 6 times the average, of 1 hour is stored into database 603c for an "Economy Delivery." The increased timing margins from a measured average are obtained to ensure a large percentage of information is downloaded to a device within the selected time in order to reduce any credits or free downloading.

Software component 415 illustrates information downloaded in response to a user selection of a download time and price. In an embodiment of the present invention, downloaded information component 415 is downloaded from information database 606 stored in server 101. In an embodiment of the present invention, application software component 416 uses downloaded information component 415 to generate an output signal from device 106. For example, application software 416 is a telephony application on a cellular telephone and downloaded information component 415 is a ring tone. In an alternate embodiment of the present invention, software components 414 and 415 are stored on respective terminals 107.

In an embodiment of the present invention, operating system 405 and Bluetooth™ Baseband software component 402 are used to generate short-range radio signals 110 that include downloaded information 415 to terminals 107.

In an alternate embodiment of the present invention, downloaded information 415, application software component 416, operating system 405 and Bluetooth™ Baseband software component 402 are used to generate short-range radio signals 110 that include output signals for terminals 107.

In an embodiment of the present invention, software 400 includes a wireless application protocol ("WAP") browser 417. In an embodiment of the present invention, WAP browser 417 is used to access web pages having representations of information to be downloaded, download times and prices provided by web site software component 608 on server 101.

In an embodiment of the present invention, software 400 includes download agent 418 for transferring information, such as files, between server 101 and device 106 in an embodiment of the present invention. Download agent 418 uses a file transfer protocol ("FTP") in an embodiment of the present invention. In an embodiment of the present invention, download agent 418 generates a user selection message to transfer software component 602 on server 101.

In an embodiment of the present invention, software 400 includes a short message service ("SMS") software component 419. In an embodiment of the present invention, SMS software component 419 generates a user selection message.

Furthermore, Graphics User Interface ("GUI") 420 is provided to allow a user-friendly interface. In an embodiment of the present invention, downloaded information 415 is a set of fonts used by GUI 420.

Figure 5A:
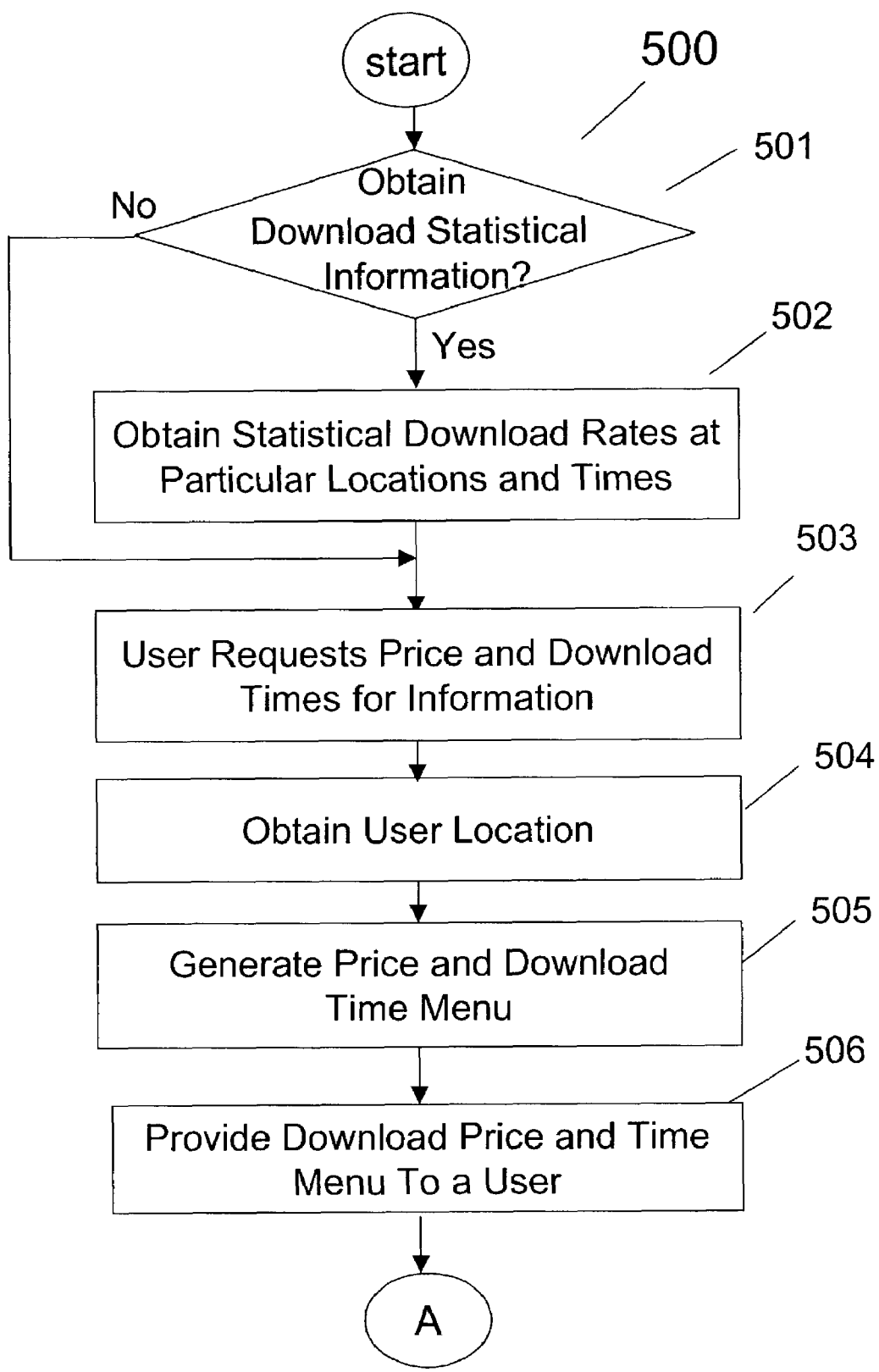
FIGS. 5*a-b* are flowcharts illustrating providing information within a predetermined period of time responsive to a price selection according to an embodiment of the present invention.
Figure 5B:
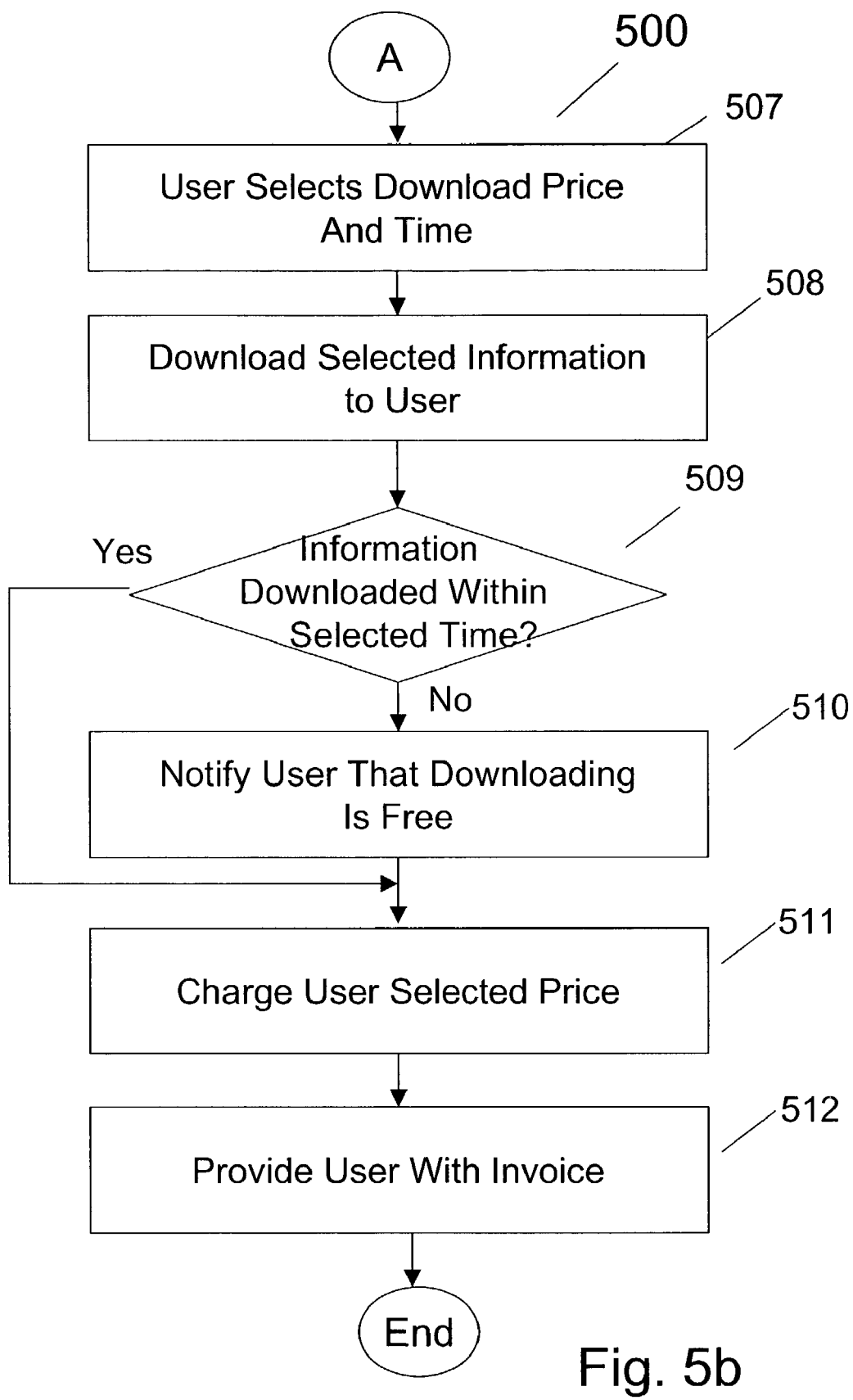

FIGS. 5a-b illustrate a method for downloading information to a device in a network within a period of time and price selected by a user according to an embodiment of the present invention. In an embodiment, a method is performed, in part or completely, by software components illustrated in FIGS. 4 and 6a-b-c. In an embodiment of the present invention, a logic box or step illustrated in FIGS. 5a-b may represent an execution of a software component, such as a software program, a software object, a software function, a software subroutine, a software method, a software instance, a code fragment, singly or in combination. In an alternate embodiment of the present invention, a logic box or step represents execution of a software component, hardware operation or user operation, singly or in combination. In an alternate embodiment of the present invention, fewer or more logic boxes or steps are carried out in the method illustrated in FIG. 5.

Method 500 initiates by making a determination whether to obtain statistical information in step 501. If statistical information is to be obtained, control transfers to logic block 502; otherwise control transfers to logic block 506.

In logic block 502, download rates are obtained for transferring information from a particular server to a device in a particular physical location in a WAN, having a cellular network, at a particular time. For example, download rates are obtained for downloading information from server 101 to device 106 at various physical locations in WAN 105 and at respective periods of time. These download rates for respective physical locations and periods of time are stored in download rate and time database 607 in server 101. In an embodiment of the present invention, a plurality of download rates for downloading information to a particular physical location in WAN 105 during a particular time period of the day is averaged and stored. For example, cellular transceiver TR121 has an averaged download rate of 5 Kbytes/sec between a time period of 12:00 p.m. and 3:59 p.m. stored in download rate and time database 607. In an alternate embodiment of the present invention, location information is not obtained and stored. In an alternate embodiment of the present invention, download rates are not measured and are obtained from a theoretical cellular model.

In an embodiment of the present invention, download rates are obtained periodically. In an alternate embodiment of the present invention, download rates are obtained before updating a download information price and time menu software component 414 stored in device 106.

Transfer software 602 obtains the amount of time for each download. For example, transfer software 602 obtains the amount of time to transfer information 606b, such as a software game, to device 106 using cellular transceiver 121 between 12:00 p.m. and 3:59 p.m. Statistics software 601 then calculates a download rate by dividing the size of information 606b by the measured download time. Measured and calculated download rates when using cellular transceiver 121 between 12:00 p.m. and 3:59 p.m. are then averaged and stored in download rate and time database 607 by statistics software 601.

A user requests prices and download times for downloading information as illustrated by logic block 503. A WAP browser 419 in device 106 is used to access a menu of representations of information, such as menu 701 shown in FIG. 7, which may be downloaded to device 106 in an embodiment of the present invention. Representations of information to be downloaded may be provided by a web site software component 608 located at server 101, and in particular by download price and time menu generation software 603. In an embodiment of the present invention, charge generation software provides a list of representations of information stored in information database 606. In an alternate embodiment, information to be downloaded to device 106 in WAN 105 is stored and provided by a web site at a remote server. In still a further embodiment of the present invention, representations of information that may be downloaded and stored in device 106 is available from download information price and time menu 414 stored on device 106 shown in FIG. 4.

A user's physical location in WAN 105 is obtained as shown by logic block 504. In an embodiment of the present invention, a user's physical location information includes the cellular transceiver currently used by device 106. In alternate embodiments of the present invention, other more general location information, such as which city a user is currently in, or other more specific location information, such as precise longitude and latitude measurements are obtained. In still a further embodiment of the present invention, location information is not obtained and stored.

In logic block 505, price and download times are generated in response to a user selecting a representation of information to be downloaded. In an embodiment of the present invention, charge generation software 603 obtains the size of the information selected by the user from information database 606 and a rate of downloading information for the current location of the user at the particular time from download rate and time database 607. Charge generation software 603 then multiplies the corresponding download rate in download rate and time database 607 by the selected size of the information to be downloaded. As described above, additional timing margins are added to the calculated download times and stored in download database 603c in an embodiment of the present invention. Respective prices are then obtained from price database 603b in an embodiment of the present invention. As described above, these prices may be based on a price per Kbytes of information to be transferred and/or on content of the information.

In logic block 506, a user is then provided with respective prices and download times for downloading the selected representation of information. For example, a user is provided with menu 703 as shown in FIG. 7. In an embodiment of the present invention, a user obtains menu 703 using WAP browser 417 from a web site software component 608 located on processing device 101. In an embodiment of the present invention, prices are provided to a user based on the averaged download rates corresponding to a user's physical location and time.

A user selects a download price and time as shown in logic block 507. A transfer request or user selection message including 1) an identification of the selected information, 2) selected price and 3) selected download time is generated from device 106 to server 101 in an embodiment of the present invention.

Selected information is downloaded to a device 106 in WAN 105 as seen in logic block 508. In an embodiment of the present invention, transfer software 602 stores a transfer request in queue 602a shown in FIG. 6b. Transfer software 602 assigns a transfer request a priority based on the selected price of a user. For example, transfer request 1 has an assigned priority value of 2 and transfer request 2 has a higher priority value of 1. A user that selects an "Express Delivery" or fastest download time is assigned a higher priority value than an "Economy Delivery" selection or slower download time. Similarly, an "Economy Delivery" has a higher priority value than a "Courtesy Delivery" selection.

Transfer software 602 then executes transfer requests depending upon the associated priority values. For example, transfer software 602 transfers information associated with transfer request 2 before transfer request 1 that has a lower priority value. Likewise, transfer software 602 transfers information associated with transfer request 5 before transfer request 4. In an embodiment of the present invention, a cellular network in WAN 105 is a dual packet switched/circuit switched cellular network such as a GSM/GPRS cellular network. For the highest priority value transfer requests, server 101, and in particular transfer software 602 initiates a transfer over a packet switched GPRS cellular network. If server 101 is unsuccessful, server 101 sends a SMS message to device 106 requesting a direct circuit switched connection with server 101, making sure needed bandwidth and QoS ("Quality of Service") is given the highest priority. If a download is still unsuccessful, server 101 repeats attempting to download selected information.

Transfer software 602 executes transfer requests associated with a lower priority value only after all the transfer requests associated with higher priority values have been completed or have timed out in an embodiment of the present invention. A time out is defined as a predetermined period of time in which the information has failed to be downloaded. An example of a time out period is 24 hours for an "Express Delivery." In an embodiment of the present invention, a user will be notified of the failed download and will not be charged. In an embodiment of the present invention, a lower priority value request is altered to a high priority value if the lower priority transfer request has not been executed within a predetermined percentage of the selected download time. For example, if an "Economy Delivery" time of 2 hours is selected by a user and the information has not been downloaded within 1 hour and 45 minutes, the associated "Economy Delivery" transfer request that had a priority value of 2 is altered to a priority value of 1 by transfer software 602.

A determination is then made whether selected information was downloaded within the selected download time as illustrated by logic block 509. In an embodiment of the present invention, charge generation software component 603 compares actual download time to a user selected download time. If information was successfully downloaded within the selected download time, control transitions to logic block 511; otherwise, a user is notified that the transfer of information was free. In an embodiment of the present invention, this notification is provided on an invoice, e-mail or message, singly or in combination, generated by transfer software 602. In an alternate embodiment of the present invention, a download price is discounted by a predetermined amount if the information was not downloaded within the selected download time.

A user is charged the selected price upon a successful transfer of information within the selected download time as shown by logic block 511. If the information was not downloaded within the selected time, a user is not charged. In an embodiment of the present invention, a charge representing the selected price is stored in user database 605, and in particular user record 605a associated with a user selecting the information to be downloaded.

An invoice including the charge or selected price is provided to a user as shown in logic block 512. In an embodiment of the present invention, invoice generation software component 604 generates an invoice using information in user database 605. In an embodiment of the present invention, an invoice is printed and mailed to a user. In an alternate embodiment of the present invention, the invoice is provided by way of e-mail or shown as a charge on a credit card monthly statement.

Method 500 then ends in an embodiment of the present invention.

IV. Conclusion

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system applicable to a mediating cellular device coupling between a wide area network and a short distance wireless network wherein a cellular network is used for ordering selected information from a processing device in the wide area network to be received by said mediating cellular device and wherein said selected information is received completely within a selected predetermined download period of time and associated corresponding price, comprising:

a statistic software component for obtaining and storing the average download rates for downloading information to a particular device at a particular location in said wide area network, wherein said average download rates are used to predetermine download periods of time and associated corresponding prices;

a first processing device, coupled to said wide area network, for storing and transferring information completely to said mediating cellular device through said cellular network, within the selected predetermined download period of time and associated corresponding price; and said mediating cellular device, to receive said information completely within a first selected download period of time and at a selected first price, wherein said first selected download period of time represents an amount of time to transfer the information from said first processing device to said mediating cellular device, and wherein a selection of representation of downloaded information comprises a plurality of predetermined prices and respective predetermined download periods of time are displayed in said short distance wireless network to a user, and wherein a selected representation of downloaded information, the selected first price and a respective download period of time, predetermined by said user, are displayed in said short distance wireless network to said user, and wherein said plurality of predetermined prices and respective download periods of time include a second price and a second download period of time, wherein said selected first price is greater than said second price and said first selected download period of time is less than said second download period of time, and wherein said respective download periods of time are different amounts of times that begin from when said user selects said selected representation of downloaded information and said selected first price and ends when said selected information is received completely by said mediating cellular device.

2. The system of claim 1, wherein the selected first price is based on a content of the information.

3. The system of claim 1, wherein said selected representation of downloaded information and the selected first price is provided to a user from a web site.

4. The system of claim 1, wherein said selected representation of downloaded information and the selected first price is provided to a user at a second device in the short distance wireless network.

5. The system of claim 1, wherein the first selected download period of time is determined in response to a predetermined data rate at a particular time and a size of the information.

6. The system of claim 1, wherein the second price is free and the second download period of time is approximately 24 hours.

7. The system of claim 1, wherein the mediating cellular device is a cellular telephone.

8. A method for ordering information from a processing device in a wide area network to be received by a mediating cellular device coupling between said wide area network and a short distance wireless network, wherein said information is received completely within a selected predetermined download period of time and associated corresponding price, comprising:

obtaining and storing the average download rates for downloading information to a particular device at a particular location in said wide area network; predetermining download periods of time and associated corresponding prices according to said average download rates;

selecting a representation of the information to be downloaded to the mediating cellular device in a short distance wireless network;

selecting a first price and a first download period of time from a plurality of prices and respective download periods of time, wherein the first price is greater than a second price and the first download period of time is less than a second download period of time; and completely transferring the information to the mediating cellular device within the first download period of time, wherein the respective download periods of time are different amounts of times that begin from selecting the first price and the first download period of time.

9. The method of claim 8, wherein selecting the representation of the information is performed by a user of the mediating cellular device in the short distance wireless network.

10. The method of claim 8, wherein selecting the representation of the information is performed at a second device in the short distance wireless network.

11. The method of claim 10, wherein the second device in the short distance wireless network is a computer.

12. The method of claim 8, wherein selecting the first price and the first download period of time is performed by a user of the mediating cellular device in the short distance wireless network.

13. The method of claim 8, further comprising:

charging the first price in response to the transferring.

14. The method of claim 8, wherein the mediating cellular device in the short distance wireless network is a cellular device.

* * * * *